(No Model.) 2 Sheets—Sheet 1.

J. V. NOOT & G. W. RYDER.
SHAFT SUPPORT.

No. 414,435. Patented Nov. 5, 1889.

WITNESSES:

INVENTOR
J. V. Noot
G. W. Ryder
BY Munn & Co.
ATTORNEY (No Model.) 2 Sheets—Sheet 2.
J. V. NOOT & G. W. RYDER.
SHAFT SUPPORT.
No. 414,435. Patented Nov. 5, 1889.
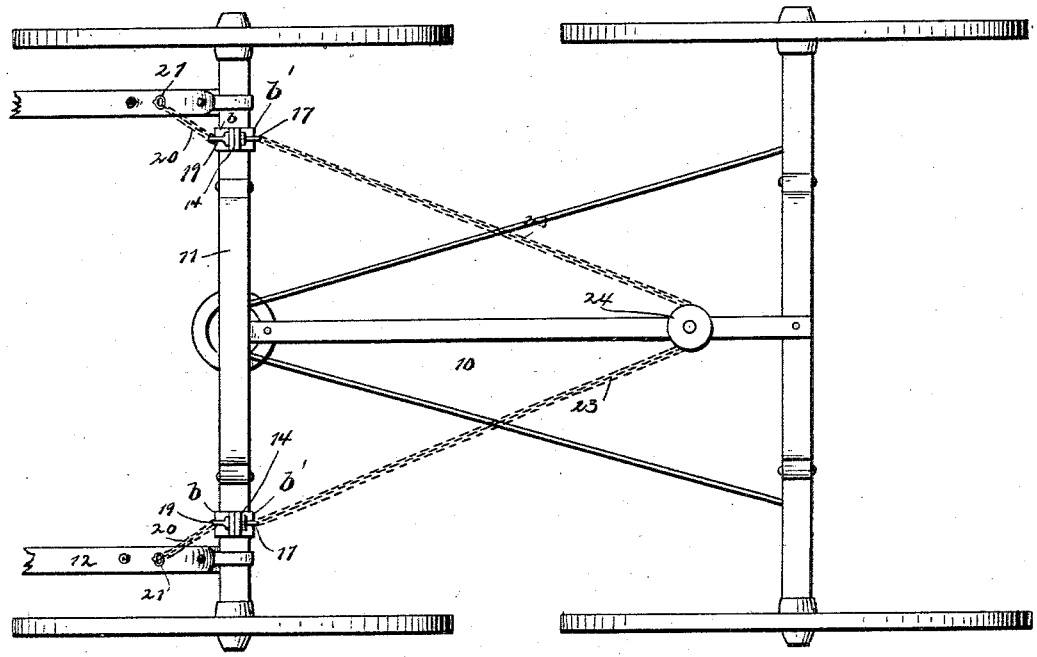
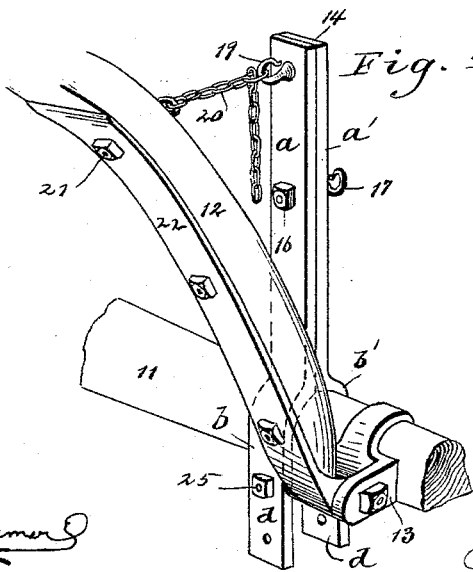

United States Patent Office.

JOHN VANDER NOOT AND GERARD W. RYDER, OF GRAVESEND, NEW YORK.

SHAFT-SUPPORT.

SPECIFICATION forming part of Letters Patent No. 414,435, dated November 5, 1889.

Application filed February 15, 1889. Serial No. 299,952. (No model.)

*To all whom it may concern:*

Be it known that we, JOHN VANDER NOOT and GERARD WASHINGTON RYDER, both of Gravesend, in the county of Kings and State of New York, have invented a new and Improved Shaft-Support, of which the following is a full, clear, and exact description.

Our invention relates to shaft-supports, the object of the invention being to provide a support by means of which the shafts will be upheld and the draft-animal relieved of the burden of their weight, the arrangement being such that by adjusting the support the shafts may be held in an elevated position at times when the vehicle is stored in the barn or stable.

To the ends named the invention consists, essentially, of standards arranged for connection with the forward axle, hooks carried by the standards, and chains connected to the shafts and arranged for connection with the hooks, the standards being preferably supported by a chain connected thereto and extending to the rear about a sheave that is carried by the reach, all as will be hereinafter more fully explained, and specifically pointed out in the claims.

Reference is to be had to the accompanying drawings, forming a part of this specification, in which similar figures and letters of reference indicate corresponding parts in all the views.

Figure 1:
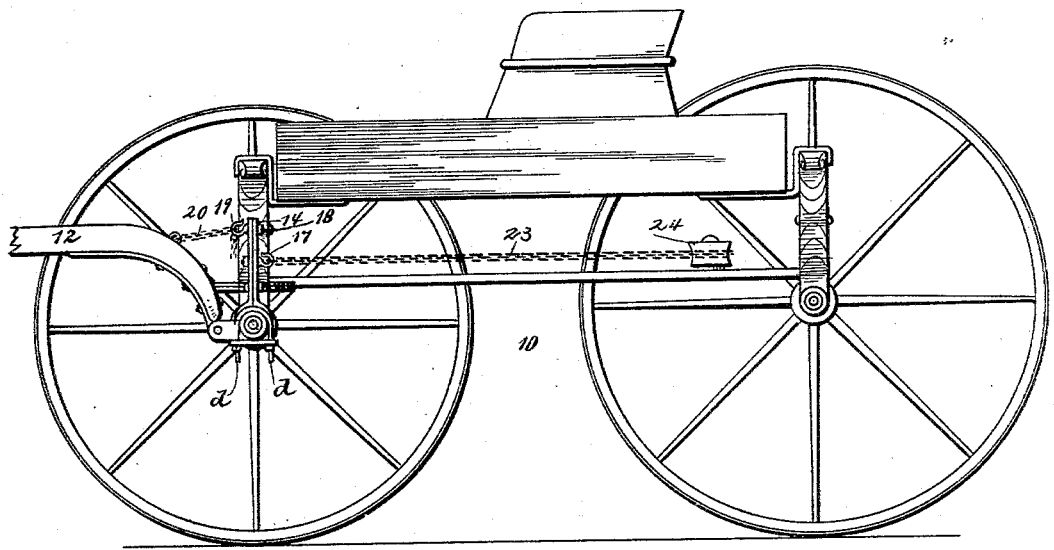
Figure 2:
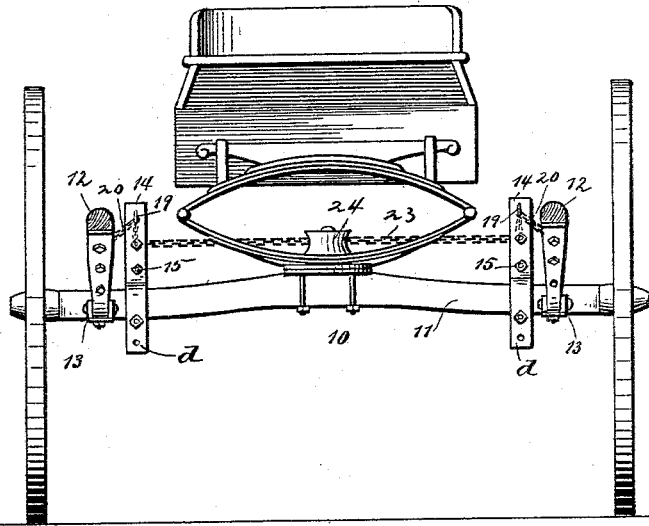

Figure 1 is a side view of a vehicle, representing the same as it appears when provided with our improved shaft-support. Fig. 2 is a face view of the vehicle. Fig. 3 is a plan view of the running-gear, and Fig. 4 is a perspective view of one of the shaft-supports and its connections.

In the drawings, 10 represents a vehicle running-gear, of which the forward axle is shown at 11, the shafts 12 being connected to such axle in the ordinary manner by clips 13. Just inside the axle-clips we mount standards 14, which consist of wrought-iron bars $a\ a'$, the lower ends of which are bent outward, as shown at $b$ and $b'$, so that when the bars are united these said lower ends will overlap the axle. Just above the bends $b\ b'$ we pass bolts 15 through the bars $a$ and $a'$, and above the bolts 15 we arrange other bolts 16, formed with hooks 17, which extend to the rear of the bars $a'$, while at a point near the upper ends of the standards we arrange bolts 18, having hooks 19, which extend forward from the standards in a position such that they may be engaged by chains 20, that are connected to the shafts 12 by eyebolts 21, which said bolts pass through the thill or shaft irons 22, as best shown in Fig. 4. By this arrangement we provide for the support of the shafts in such position as may be required, and it will be seen that the horse will be relieved from the support of the weight of the shafts, so that harnesses could be made without saddles, if such style of harness were desired.

Although not absolutely essential to the proper working of our improved shaft-support, we prefer to brace and steady the standards 14 by means of a chain 23, said chain passing about a sheave 24, that is secured to the wagon-reach or to any other convenient fixed support—such as the bottom of the wagon-body—while the ends of the chain are connected to the hooks 17, this arrangement providing for the free turning of the forward axle and insuring a steady support for the standards.

By means of the construction above described not only is the horse relieved from the burden otherwise imposed by the weight of the shafts, but with the ordinary form of tradesmen's vehicles—such as butchers' or grocers' carts—the step by which the driver enters the vehicle is usually located upon the shafts, and consequently every time the driver enters or leaves the vehicle the horse is subjected to a severe shock. Our invention, however, obviates all this.

When the vehicle is to be stowed away in the stable or barn, the chain 20 is so brought into engagement with the hooks 19 that the shafts may be upheld in an elevated position.

In order that the standards 14 may be connected to axles of different sizes, we prefer to form the bars $a$ and $a'$ so that they will extend some distance downward and below the axle, and in these downwardly-extending sections $d$ we form two sets of apertures, through either one of which sets of apertures the clamping-bolt 25 may be passed. By this arrangement we provide for the connection of the standards to almost any style and size of vehicle.

Having thus described our invention, we claim as new and desire to secure by Letters Patent—

1. The combination, with standards made up of bars $a$ and $a'$, bent as described, of bolts 18, formed with hooks 19, clamping-bolts 15 and 25, eyebolts 21, arranged in connection with the shafts, and chains 20, carried by the eyebolts and arranged for connection with the hooks 19, substantially as described.

2. The combination, with standards 14, arranged in connection with the forward axle of a vehicle, of bolts 16 and 18, formed with hooks 17 and 19, respectively, and connected to the standards, eyebolts arranged in connection with the shafts, chains carried by said eyebolts and arranged for connection with the hooks 19, a chain 23, connected to the hooks 17, and a sheave 24, arranged in connection with a vehicle-reach, the chain 23 passing about said sheave, substantially as described.

JOHN VANDER NOOT.
GERARD W. RYDER.

Witnesses:
 EDWARD KENT, Jr.,
 C. SEDGWICK.